(12) United States Patent
Hagio et al.

(10) Patent No.: US 11,945,379 B2
(45) Date of Patent: Apr. 2, 2024

(54) SOUND-ABSORBING MATERIAL FOR VEHICLES

(71) Applicant: KOTOBUKIYA FRONTE CO., LTD., Tokyo (JP)

(72) Inventors: Tomoyuki Hagio, Tokyo (JP); Morio Suzuki, Tokyo (JP); Yoshiaki Suzuki, Tokyo (JP); Satoshi Shimada, Tokyo (JP)

(73) Assignee: KOTOBUKIYA FRONTE CO., LTD., Tokyo (JP)

( * ) Notice: Subject to any disclaimer, the term of this patent is extended or adjusted under 35 U.S.C. 154(b) by 457 days.

(21) Appl. No.: 17/270,651

(22) PCT Filed: May 9, 2019

(86) PCT No.: PCT/JP2019/018633
§ 371 (c)(1),
(2) Date: Feb. 23, 2021

(87) PCT Pub. No.: WO2020/049797
PCT Pub. Date: Mar. 12, 2020

(65) Prior Publication Data
US 2021/0245682 A1    Aug. 12, 2021

(30) Foreign Application Priority Data

Sep. 7, 2018    (JP) .................... 2018-167670

(51) Int. Cl.
*B60R 13/08*    (2006.01)
*B32B 5/02*    (2006.01)
(Continued)

(52) U.S. Cl.
CPC ............ *B60R 13/0815* (2013.01); *B32B 5/02* (2013.01); *B32B 5/16* (2013.01); *B32B 5/18* (2013.01);
(Continued)

(58) Field of Classification Search
CPC ......... B60R 13/0815; B32B 5/02; B32B 5/16; B32B 5/18; B32B 5/245; B32B 5/26;
(Continued)

(56) References Cited

U.S. PATENT DOCUMENTS 6,102,465 A * 8/2000 Nemoto .................. B60R 13/08
296/39.3
6,145,617 A * 11/2000 Alts .......................... B32B 5/22
181/290

(Continued)

FOREIGN PATENT DOCUMENTS

EP        3 015 314 A1    5/2016
JP        2000-516175 A   12/2000
(Continued)

OTHER PUBLICATIONS

Office Action dated Jun. 21, 2022 issued by the Japanese Patent Office in Japanese Application No. 2020-541011.
(Continued)

*Primary Examiner* — Forrest M Phillips
(74) *Attorney, Agent, or Firm* — Sughrue Mion, PLLC; Richard C. Turner

(57) ABSTRACT

A sound-absorbing material for vehicles that is mounted to a vehicle interior and that is provided with a main body in which at least a fibrous material and a skin material are integrally molded. The sound-absorbing material for vehicles is characterized in that a sound-absorbing section provided to at least part of the main body is formed so as to be mounted to the vehicle interior within a range in which the vertical distance Elh from the lower surface of the head rests of the front seats downward is 0.1-0.4 m, and in that the air flow resistance AFR ($Ns/m^3$) and the vertical distance Elh (m) satisfy $210 < AFR + 10/Elh < 3020$.

8 Claims, 15 Drawing Sheets

(51) Int. Cl.
*B32B 5/16* (2006.01)
*B32B 5/18* (2006.01)
*B32B 5/24* (2006.01)
*B32B 5/26* (2006.01)
*B32B 5/30* (2006.01)
*G10K 11/168* (2006.01)

(52) U.S. Cl.
CPC ............... *B32B 5/245* (2013.01); *B32B 5/26* (2013.01); *B32B 5/30* (2013.01); *G10K 11/168* (2013.01); *B32B 2250/04* (2013.01); *B32B 2262/0284* (2013.01); *B32B 2264/0257* (2013.01); *B32B 2266/0278* (2013.01); *B32B 2307/102* (2013.01); *B32B 2307/7242* (2013.01); *B32B 2605/003* (2013.01)

(58) Field of Classification Search
CPC ................ B32B 5/30; B32B 2250/04; B32B 2262/0284; B32B 2264/0257; B32B 2266/0278; B32B 2307/7242; B32B 2605/003; G10K 11/168
See application file for complete search history.

(56) References Cited

U.S. PATENT DOCUMENTS

| | | | |
|---|---|---|---|
| 2007/0007788 | A1 | 1/2007 | Araga et al. |
| 2008/0302049 | A1* | 12/2008 | Stoneburner ........... B60R 13/08 52/506.01 |
| 2009/0026787 | A1* | 1/2009 | Muller ................ B60R 13/0815 296/39.1 |
| 2009/0026788 | A1* | 1/2009 | Billarant ............. B60R 13/0815 296/39.3 |
| 2009/0038881 | A1* | 2/2009 | Fukuhara ............. G10K 11/162 181/294 |
| 2010/0146758 | A1* | 6/2010 | Galbreath ................ B60N 2/70 29/91.1 |
| 2017/0129204 | A1 | 5/2017 | Mori |
| 2017/0361785 | A1 | 12/2017 | Guigner et al. |

FOREIGN PATENT DOCUMENTS

| | | |
|---|---|---|
| JP | 2003-316366 A | 11/2003 |
| JP | 2005-247266 A | 9/2005 |
| JP | 2006-160177 A | 6/2006 |
| JP | 2009-126496 A | 6/2009 |
| JP | 2015-138055 A | 7/2015 |
| JP | 2016-045450 A | 4/2016 |
| JP | 2017-533142 A | 11/2017 |
| JP | 6484408 B2 | 3/2019 |
| KR | 10-2007-0033453 A | 3/2007 |
| KR | 10-2011-0108011 A | 10/2011 |
| KR | 10-2017-0077985 A | 7/2017 |
| WO | 2006/007276 A1 | 1/2006 |
| WO | 2017/071943 A1 | 5/2017 |

OTHER PUBLICATIONS

Office Action dated Feb. 1, 2022 in Japanese Application No. 2020-541011.
Extended European Search Report dated May 6, 2022 in European Application No. 19858613.3.
Office Action dated May 24, 2022 issued by the Korean Patent Office in Korean Application No. 10-2021-7006042.
International Search Report of PCT/JP2019/018633 dated Jun. 11, 2019 [PCT/ISA/210].
Written Opinion of PCT/JP2019/018633 dated Jun. 11, 2019 [PCT/ISA/237].

* cited by examiner (a)

| | surface density(g/m²) | thickness(mm) | AFR(N·s·m⁻³) |
|---|---|---|---|
| first modification | 1671 | 24.1 | 900 |
| second modification | 1323 | 23.1 | 270 |
| third modification | 1065 | 12.1 | 240 |

SOUND-ABSORBING MATERIAL FOR VEHICLES

CROSS REFERENCE TO RELATED APPLICATIONS

This application is a National Stage of International Application No. PCT/JP2019/018633, filed May 9, 2019, claiming priority to Japanese Patent Application No. 2018-167670, filed Sep. 7, 2018.

FIELD

The present invention relates to a sound-absorbing material for vehicles.

BACKGROUND

It is known that in a vehicle such as an automobile, a sound-absorbing material is used for absorbing unpleasant noise, while designing an interior of the vehicle. Furthermore, a multilayer trim part for vehicles is known which comprises, for absorbing noise, a porous intermediate film layer between two fiber layers, and in which an overall airflow resistance ($AFR_{overall}$ in a unit of $Ns/m^3$) and an overall density $\rho$ ($kg/m^3$) have a relation of $1500 < AFR_{overall} - 10\rho < 3800$ in a region having a thickness from 4 to 12.5 mm (e.g., see PTL 1).

CITATION LIST

Patent Literature

[PTL 1] JP 2017-533142 A

SUMMARY

Technical Problem

In a conventional dash insulator or carpet, however, an airflow resistance is set to be rather high, to increase sound-absorbing effect, and the sound-absorbing effect is exerted even in a frequency band of conversation between passengers. Consequently, there is a problem that if a conventional sound-absorbing material that has high airflow resistance is disposed, for example, on a back surface of a front seat close to passenger's ears, a passengers in the vehicle less easy to have conversation between a passenger in a rear seat and a passenger in a front seat because of absorbing voice of the conversation.

In view of the above problem, an object of the present invention is to provide a sound-absorbing material for vehicles that is capable of absorbing unpleasant noise in a vehicle interior while maintaining clear conversation between a passenger in a rear seat and a passenger in a front seat.

Solution to Problem

To solve the above problem and achieve the object, a sound-absorbing material for vehicles according to an aspect of the present invention is mounted to a vehicle interior and comprises a main body in which at least a fiber material and a surface are integrally formed, wherein a sound-absorbing section provided in at least one part of the main body is formed to be mounted to the vehicle interior within a range in which a vertical distance Elh downward from a lower surface of a head rest of a front seat is from 0.1 to 0.4 m, and an airflow resistance AFR ($Ns/m^3$) and the vertical distance Elh (m) satisfy a relation of: $210 < AFR + 10/Elh < 3020$.

Furthermore, in the sound-absorbing material for vehicles according to the aspect of the present invention, in the sound-absorbing section, a non-ventilating material is applied on the fiber material on the opposite side of the surface.

Additionally, in the sound-absorbing material for vehicles according to the aspect of the present invention, the non-ventilating material is a non-ventilating thin film.

In addition, in the sound-absorbing material for vehicles according to the aspect of the present invention, the sound-absorbing section comprises a foam material such as urethane having a thickness of 5 mm or more and 15 mm or less between the fiber material and the surface material.

Furthermore, in the sound-absorbing material for vehicles according to the aspect of the present invention, in the sound-absorbing section, a sound absorption coefficient at a frequency of 1000 Hz or more is set to be higher than a sound absorption coefficient at a frequency that is less than 1000 Hz.

Advantageous Effects of Invention

The present invention produces an effect that unpleasant noise in a vehicle interior can be absorbed, while maintaining clear conversation between a passenger in a rear seat and a passenger in a front seat.

BRIEF DESCRIPTION OF DRAWINGS

FIG. 16 is a table showing characteristics of the first modification to the third modification of the sound-absorbing section.

DESCRIPTION OF EMBODIMENTS

Figure 1:
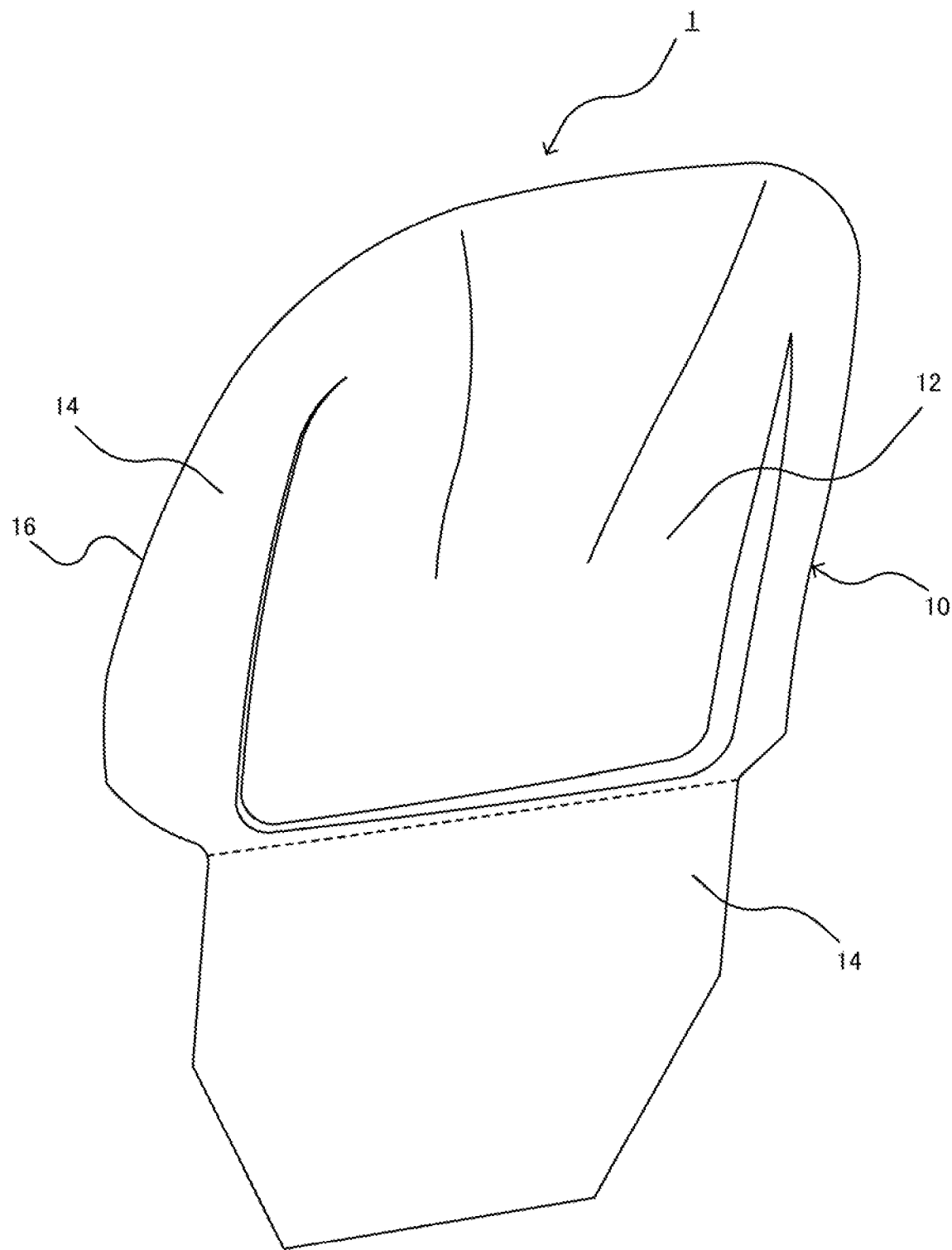
FIG. 1 is a perspective view illustrating a state of a sound-absorbing material for vehicles according to an embodiment seen from the surface.

Hereinafter, an embodiment of a sound-absorbing material for vehicles will be described with reference to the drawings. FIG. 1 is a perspective view illustrating a state of a sound-absorbing material for vehicles 1 according to the embodiment seen from the surface. Furthermore, FIG. 2 is a perspective view illustrating a state where the sound-absorbing material for vehicles 1 according to the embodiment is attached to a back side of a front seat 50 in a vehicle interior.

Figure 2:
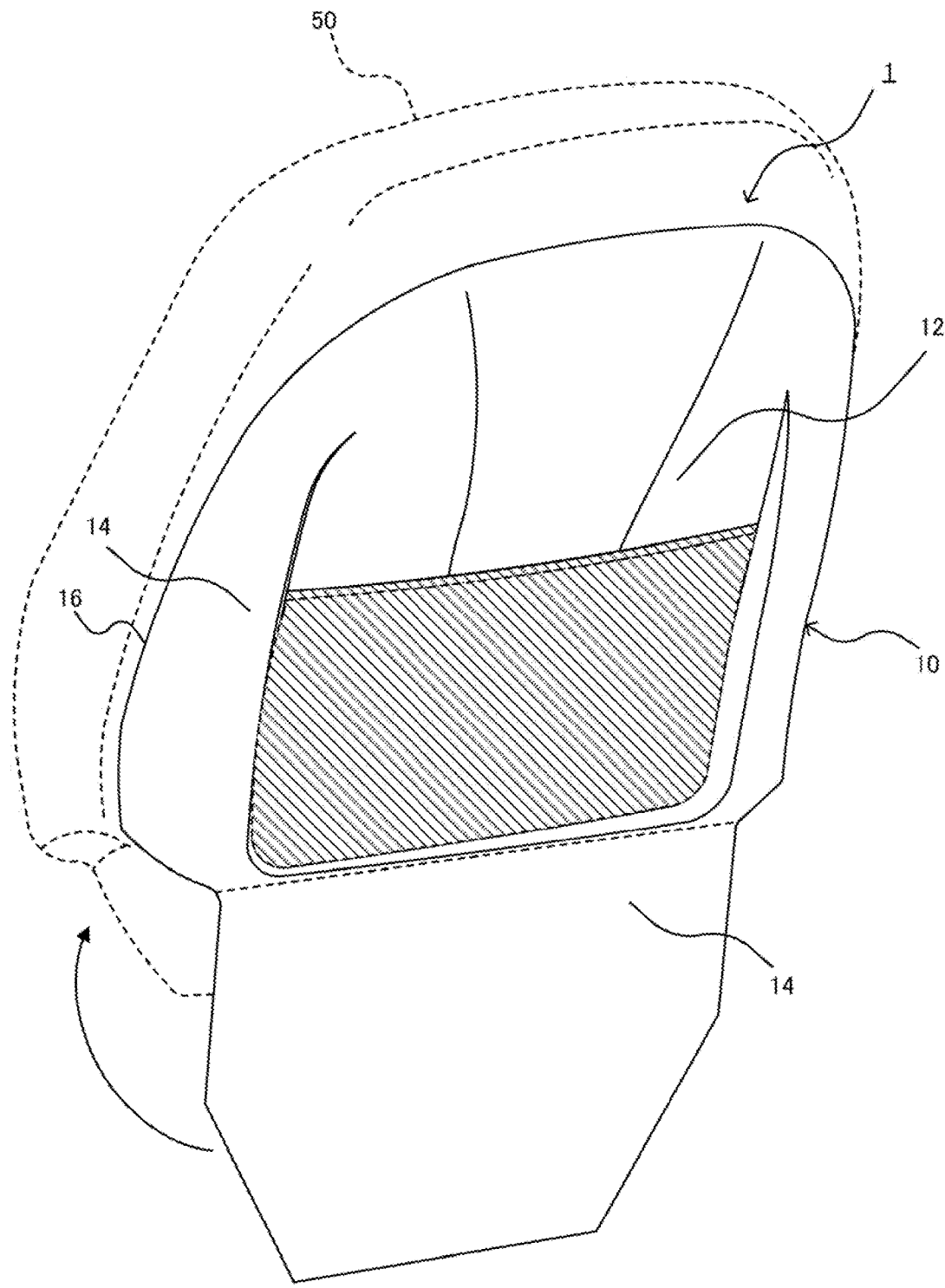
FIG. 2 is a perspective view illustrating a state where the sound-absorbing material for vehicles according to the embodiment is assembled to a back side of a front seat in a vehicle.

As shown in FIG. 1 and FIG. 2, in the sound-absorbing material for vehicles 1, a main body 10 is integrally formed to be attachable to a vehicle interior without providing an fixing hole in the surface. An approximate center of the main body 10 is provided with a sound-absorbing section 12 in which a predetermined airflow resistance is set. In the sound-absorbing section 12, a thickness of a region shown by diagonal lines in FIG. 2 may be larger than a thickness of another region so that sound absorption characteristics of the region are different from those of the other region. For example, in the sound-absorbing section 12, the sound absorption characteristics are set so that sound absorption from conversation between passengers is inhibited, while absorbing another unpleasant noise in the vehicle.

Additionally, in the main body 10, a rim section 14 is formed by compressing peripheral. Furthermore, in the rim section 14, a bent section 16 is formed, for example, by bending a side part and upper part of the main body 10.

Then, in the sound-absorbing material for vehicles 1, the bent section 16 formed in the side part and upper part of the main body 10 is fixed along the back side of the front seat 50 in accordance with roundness around a back surface of the front seat 50. Here, the rim section 14 formed in a lower part of the main body 10 is bent downward from the front seat 50.

Figure 3:
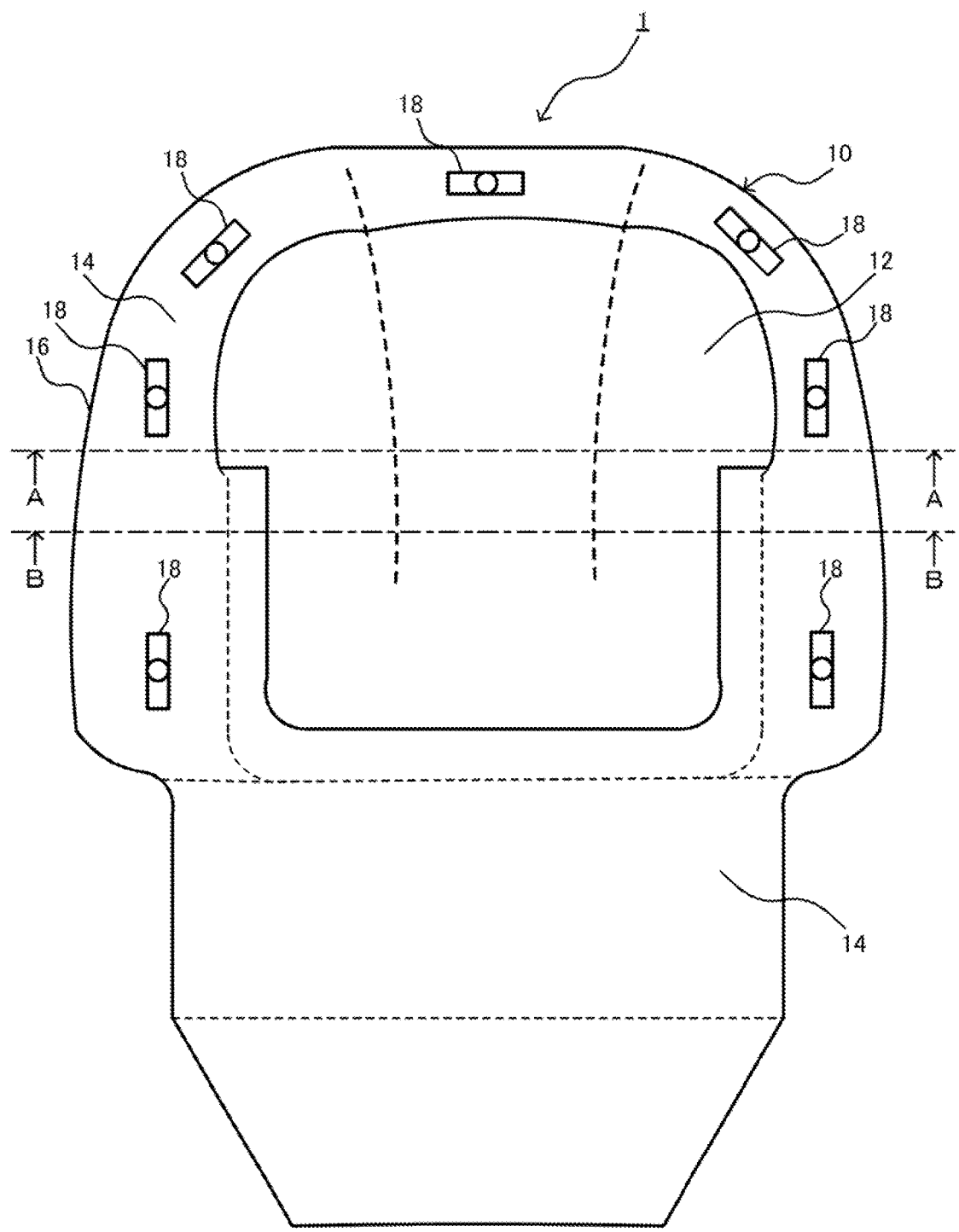
FIG. 3 is a view illustrating a configuration of a back side of the sound-absorbing material for vehicles.

FIG. 3 is a view illustrating a configuration of a back side of the sound-absorbing material for vehicles 1. As shown in FIG. 3, the sound-absorbing section 12 is disposed in the approximate center of the main body 10 so that a region provided with a sound-absorbing function widens. Furthermore, on a back side of the rim section 14, a plurality of fixed parts 18 to be fixed to the front seat 50 are arranged, for example, via a space being from 50 to 220 mm. Furthermore, when the sound-absorbing material for vehicles 1 is attached to the front seat 50, load is applied to the space between the fixed part 18 and the fixed part 18. A shape and structure of the fixed part 18 will be described later with reference to FIG. 5. Then, the rim section 14 is formed, by compression molding, to be continuous among the plurality of fixed parts 18, and the bent section 16 is formed. Furthermore, the sound-absorbing section 12 is provided adjacent to the rim section 14 via a stepped part on an inner side of the rim section 14, and among the plurality of fixed parts 18, to absorb sound of the vehicle interior. Additionally, to form the bent section 16, at least a part of the rim section 14 is bent almost along the stepped part so that the rim section is continuous among the plurality of fixed parts 18.

Figure 4:
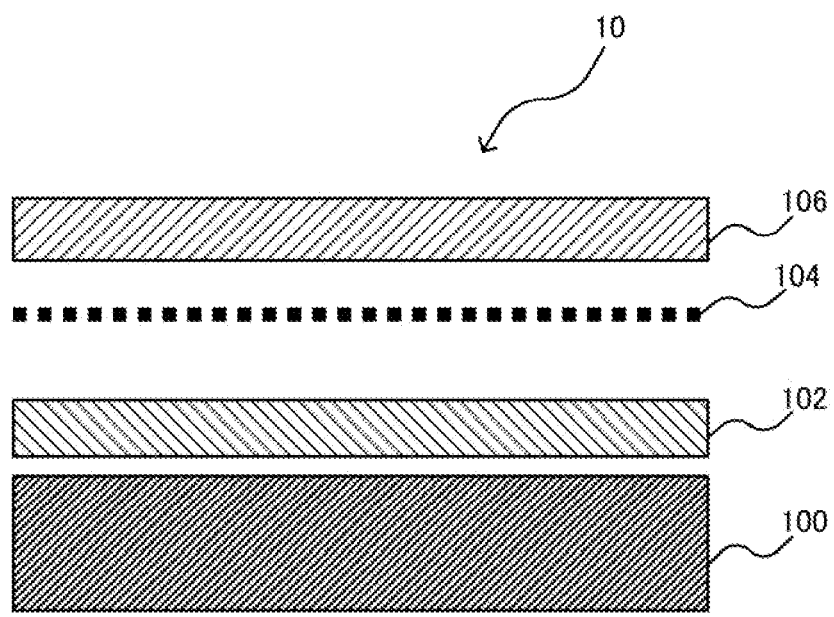
FIG. 4 is a view schematically showing a cross section of an integrally formed main body.

FIG. 4 is a view schematically showing a cross section of the integrally formed main body 10. As shown in FIG. 4, the main body 10 includes a configuration where, for example, a first fiber material 100, a second fiber material 102, PE powder 104 and a surface 106 are stacked and integrally formed.

The first fiber material 100 is, for example, made of 900 g/m² of polyethylene terephthalate (PET). The second fiber material 102 is, for example, made of 200 g/m² of PET. The PE powder 104 is, for example, a powder body made of 100 g/m² of polyethylene (PE). The surface 106 is, for example, a surface material made of 150 g/m² of tricot or the like.

Figure 5:
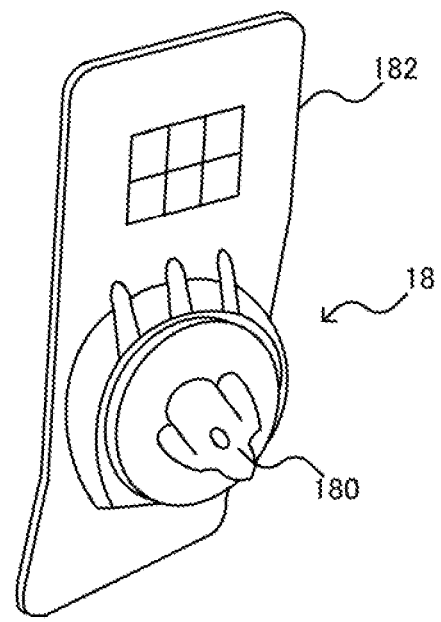
FIG. 5 is a perspective view illustrating an outline of a fixed part.

FIG. 5 is a perspective view illustrating an outline of the fixed part 18. The fixed part 18 is, for example, made of plastic, and includes a configuration where an adhesive surface 182 is provided on a lower surface of a bonding protrusion 180. The bonding protrusion 180 is formed to be mechanically couplable to each of a plurality of bonding parts (not shown) provided on the back side of the front seat 50 by use of material elasticity without using any adhesives. The adhesive surface 182 is provided to fix the fixed part 18 to the rim section 14 of the sound-absorbing material for vehicles 1 with the adhesive.

Next, a structure of the main body 10 will be described in detail.

Figure 6:
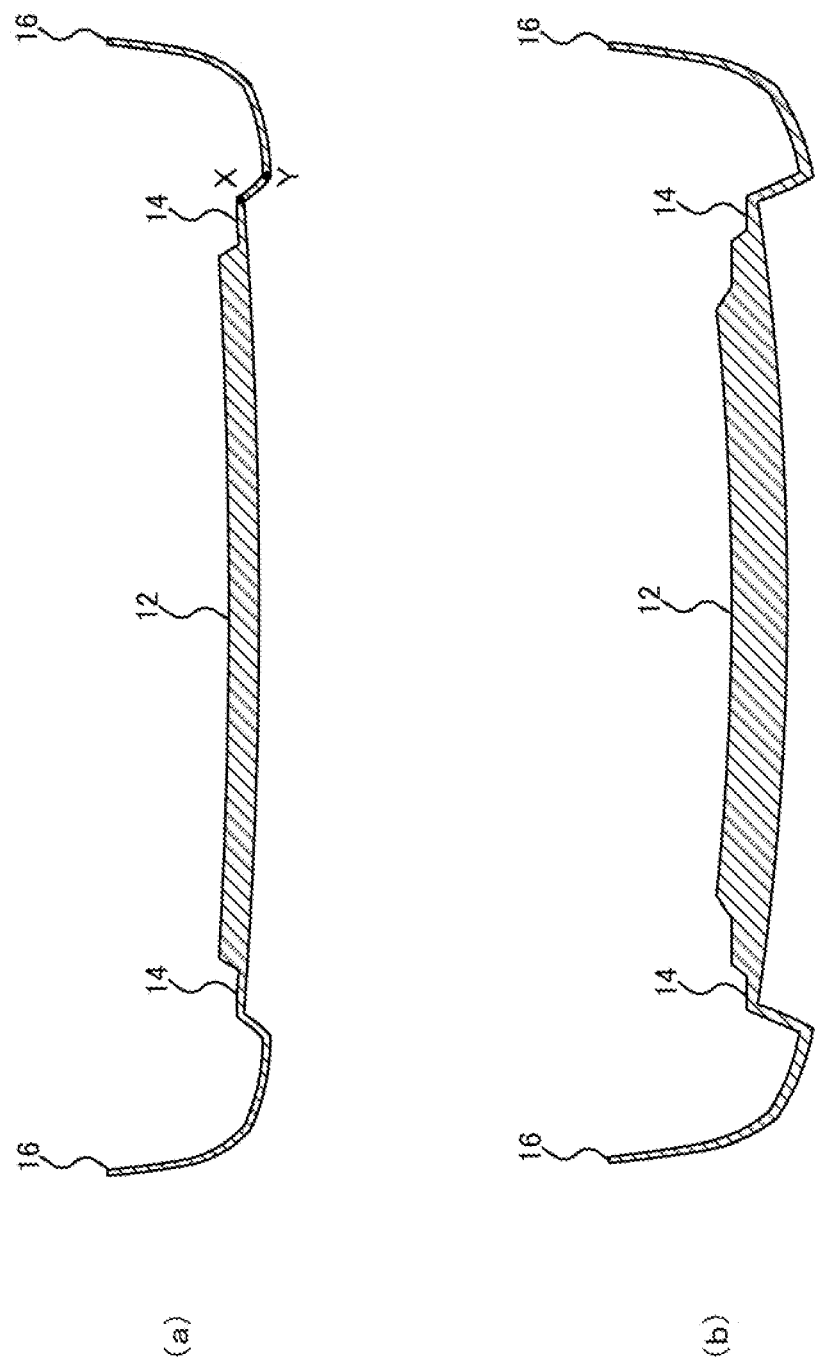
FIG. 6(a) is a view showing a cross-sectional structure along the A-A line shown in FIG. 3.
FIG. 6(b) is a view showing a cross-sectional structure along the B-B line shown in FIG. 3.

FIG. 6 is a view showing a cross-sectional structure of the main body 10. FIG. 6(a) is a view showing the cross-sectional structure along the A-A line shown in FIG. 3. FIG. 6(b) is a view showing a cross-sectional structure along the B-B line shown in FIG. 3. Furthermore, each of FIGS. 7(a), (b) is an enlarged view of the rim section 14 in FIG. 6(a).

As shown in FIG. 6(a), the sound-absorbing section 12 is not compressed, unlike the rim section 14, and is provided in the almost center of the main body 10, in which the predetermined airflow resistance is set. Furthermore, as shown in FIG. 6(b), the sound-absorbing section 12 is not compressed, unlike the rim section 14, and the almost center of the main body 10 has a thickness larger than that of a corresponding part shown in FIG. 6(a), and has sound absorption characteristics changed from those of the part shown in FIG. 6(a).

Figure 7:
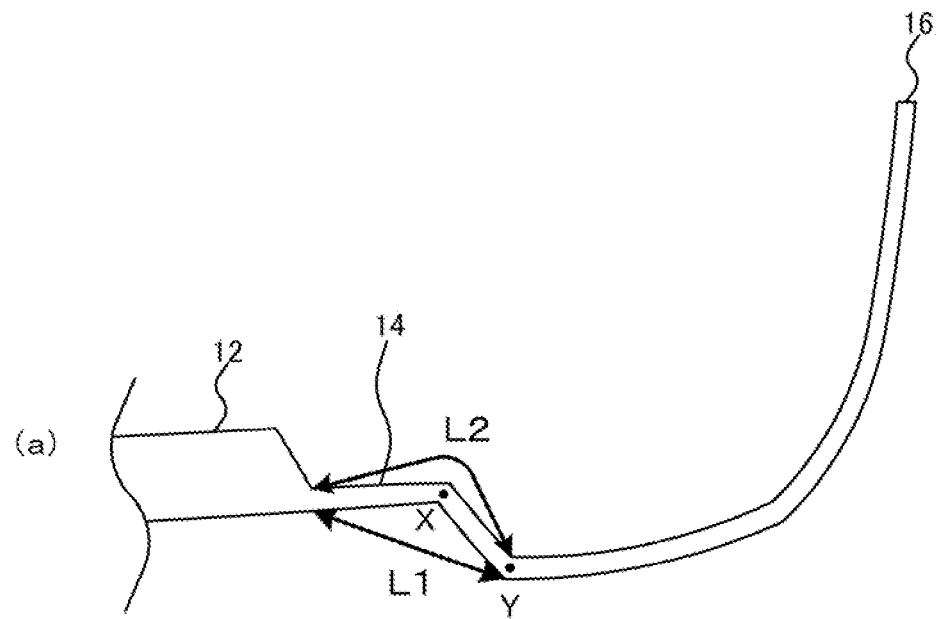
FIG. 7(a) is a first enlarged view of a rim section in FIG. 6(a).
FIG. 7(b) is a second enlarged view of the rim section in FIG. 6(a).
Figure 7:
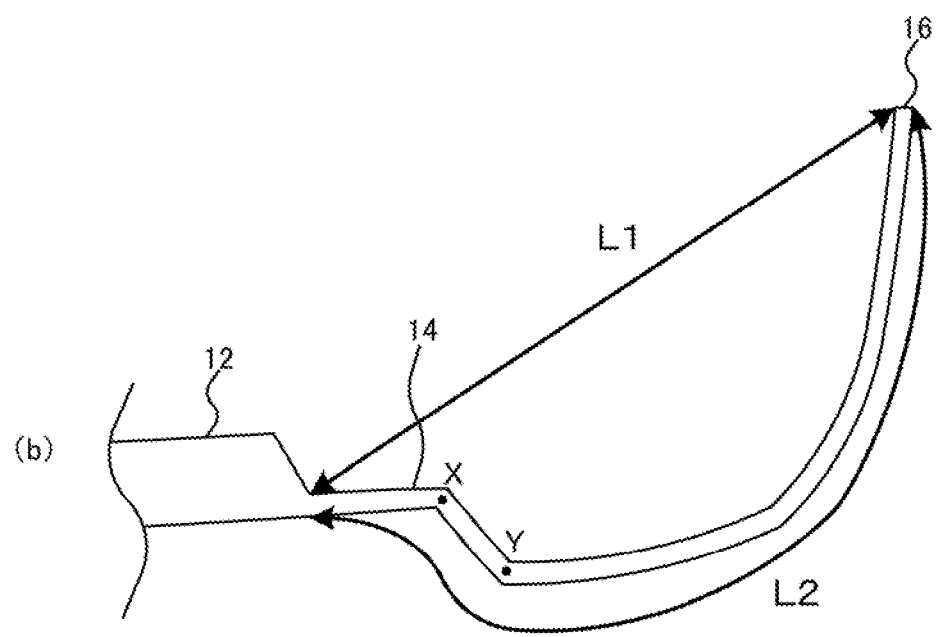

Additionally, the rim section 14 is bent at a position X and a position Y, and has an end curved, to form the bent section 16. Here, as shown in FIG. 7(a), the bent section 16 is formed so that in a part bent at the position X, a ratio of an actual width (an actual length) L2 to a straight line distance width L1 is larger than 1 and smaller than 1.3. That is, in the bent section 16, a ratio of the actual width to a straight line distance width from the stepped part to an outer end of the rim section 14 is larger than 1 and smaller than 1.3. A plurality of stepped parts are provided, and a stepped part on a sound-absorbing section 12 side is higher than a stepped part on a rim section 14 side.

Furthermore, as shown in FIG. 7(b), the bent section 16 is formed so that in the parts bent at the position X and the position Y, the ratio of the actual width L2 to the straight line distance width L1 is larger than 1 and smaller than 1.3. That is, in a case where the bent section 16 is bent a plurality of times in a width direction, each of a ratio of the actual width L2 to the straight line distance width L1 in each bent part and a ratio of the actual width L2 to an overall straight line distance width L1 is set to be larger than 1 and smaller than 1.3.

Figure 8:
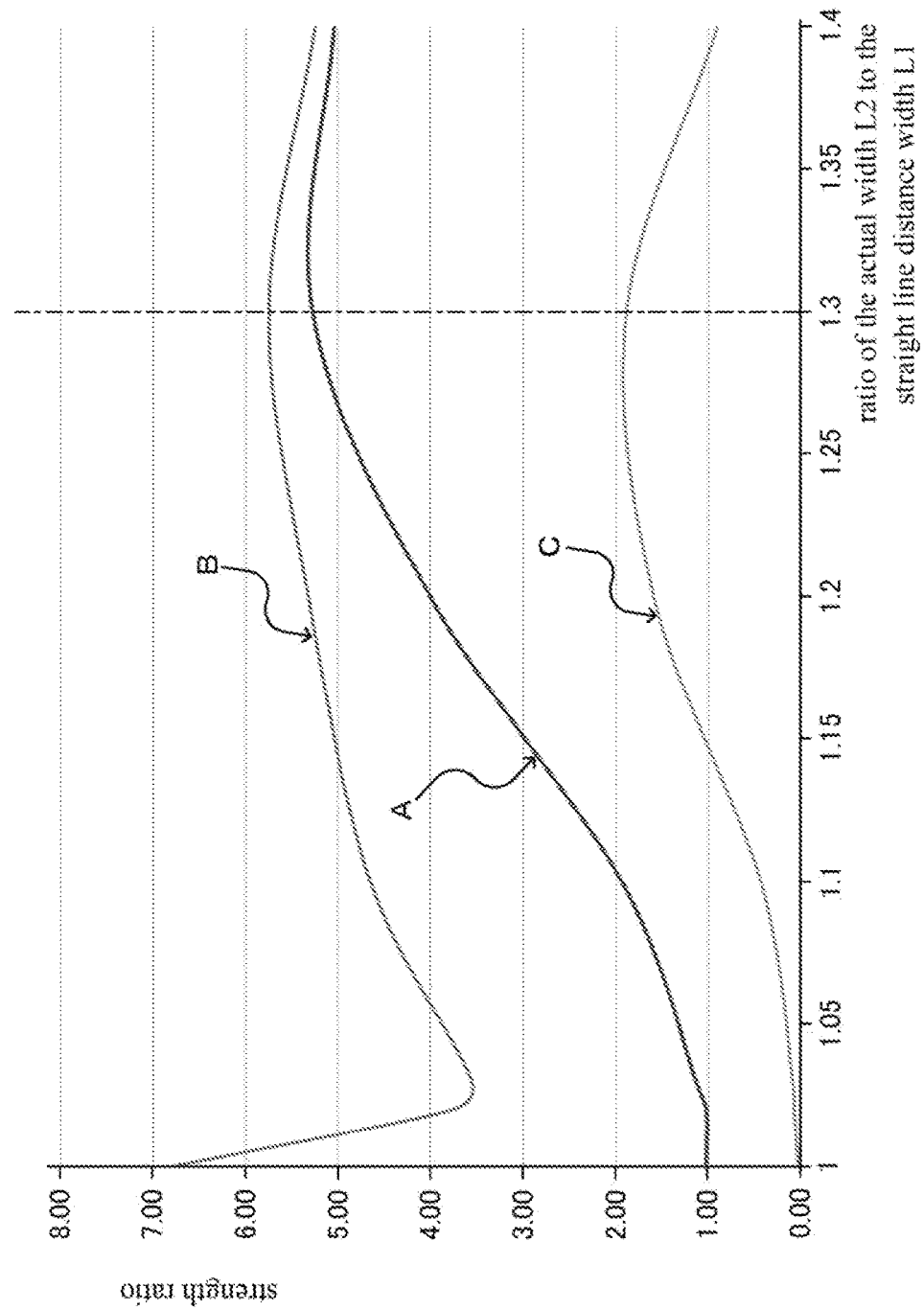
FIG. 8 is a graph showing a result of measurement, by experiment, of a relation between a ratio of an actual width to a distance and a ratio of a strength at the rim in the sound-absorbing material for vehicles.

FIG. 8 is a graph showing a result of measurement, by experiment, of a relation between the ratio of the actual width L2 to the straight line distance width L1 and a strength ratio of the rim section 14 in the sound-absorbing material for vehicles 1. Note that in FIG. 8, a space between the fixed part 18 and the fixed part 18 that are provided in the rim section 14 is set to 58 mm, and this space of 58 mm is set as a space between fulcrums. Then, in a case where load is applied to the rim section 14, a displacement amount is measured. In this case, a strength at a time when the ratio of the actual width L2 to the straight line distance width L1 is 1 is used as a reference (the strength=1), and the strength ratio of the rim section 14 is indicated. Here, it is indicated that when the ratio of the actual width L2 to the straight line distance width L1 is 1, the rim section 14 is not bent and is planar.

Therefore, a curve denoted with A in FIG. 8 shows a relation between the ratio of the actual width L2 to the straight line distance width L1 and the strength of the rim section 14, when the space between the fulcrums (the space between the fixed part 18 and the fixed part 18) is set to 58 mm. Furthermore, a curve denoted with B in FIG. 8 shows a relation between the ratio of the actual width L2 to the straight line distance width L1 and the strength of the rim section 14, when the space between the fulcrums is set to 40 mm. Additionally, a curve denoted with C in FIG. 8 shows a relation between the ratio of the actual width L2 to the straight line distance width L1 and the strength of the rim section 14, when the space between the fulcrums is set to 200 mm.

As shown in FIG. 8, it is confirmed that the rim section 14 tends to have the highest strength, when the ratio of the actual width L2 to the straight line distance width L1 is about 1.3, regardless of a length of the space between the fulcrums (the space between the fixed part 18 and the fixed part 18). Consequently, the rim section 14 is formed so that the ratio of the actual width L2 to the straight line distance width L1 is larger than 1 and smaller than 1.3.

Next, description will be made as to a position where the sound-absorbing material for vehicles 1 is mounted, in the vehicle interior, and sound absorption characteristics of the sound-absorbing material for vehicles 1.

Figure 9:
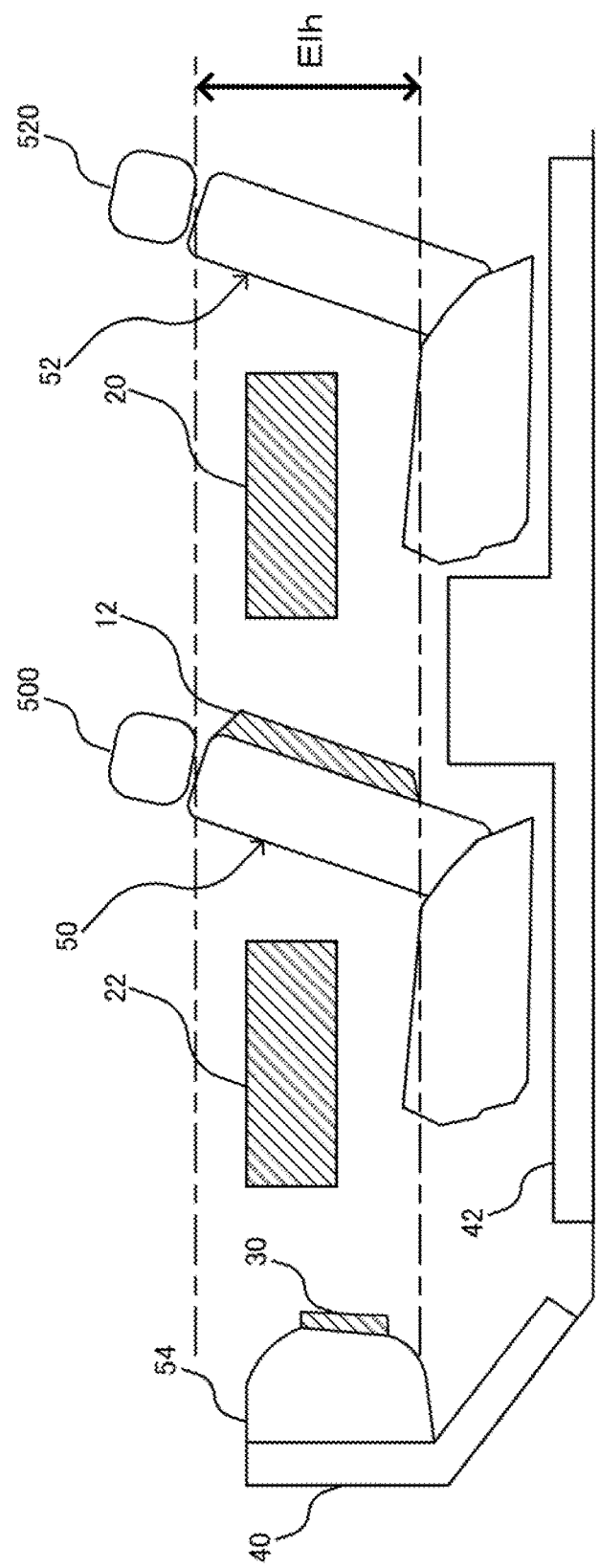
FIG. 9 is a view illustrating a position where the sound-absorbing material for vehicles is mounted, in the vehicle, in accordance with arrangement of a sound-absorbing section.

FIG. 9 is a view illustrating the position where the sound-absorbing material for vehicles is mounted, in the vehicle interior, in accordance with arrangement of the sound-absorbing section. For example, in the sound-absorbing material for vehicles 1 shown in FIG. 1, the sound-absorbing section 12 provided on the almost center of the main body 10 is formed to be mounted to the vehicle interior within a range in which a vertical distance Elh downward from a lower surface of a head rest 500 of the front seat 50 is from 0.1 to 0.4 m.

Furthermore, also in a case where the sound-absorbing material for vehicles is provided on an inner side of a door or the like on a rear seat 52 side between the front seat 50 and the rear seat 52, a sound-absorbing section 20 of the sound-absorbing material for vehicles is mounted to the vehicle interior within the range in which the vertical distance Elh downward from the lower surface of the head rest 500 of the front seat 50 is from 0.1 to 0.4 m. Additionally, also in a case where the sound-absorbing material for vehicles is provided on an inner side of a door or the like of the front seat 50, or a surface of a dashboard 54 between the dashboard 54 and the front seat 50, as shown in FIG. 9, each of a sound-absorbing section 22 and a sound-absorbing section 30 of the sound-absorbing material for vehicles is mounted to the vehicle interior within the range in which the vertical distance Elh downward from the lower surface of the head rest 500 of the front seat 50 is from 0.1 to 0.4 m.

Furthermore, if backrest parts of the front seat 50 and the rear seat 52 are stood vertically or reclined and inclination of each backrest is changed, for example, in a range from about 0 to 30 degrees, a position of the head rest 500 or a head rest 520 varies. Even in this case, the vertical distance Elh is set to be in the range from 0.1 to 0.4 m.

Additionally, the sound-absorbing section 12 is configured so that an airflow resistance AFR (Ns/m$^3$) and the vertical distance Elh (m) satisfy Equation (1) as follows.

$$210 < AFR + 10/Elh < 3020 \qquad (1)$$

Note that the sound-absorbing material for vehicles 1 in the present application does not include a dash insulator 40 and a carpet 42. This is because the dash insulator provided between a boarding space of the vehicle interior and an engine compartment or the like, is hard for the passenger to see and hence is not provided with the surface 106. That is, the dash insulator is disposed at a position distant from positions of ears and a mouth of a general adult passenger. Also, the carpet 42 is disposed at a position distant from the positions of the ears and mouth of the general adult passenger. Specifically, it is considered that the dash insulator 40 and the carpet 42 have a relatively low degree of influence on clarity in conversation between passengers.

Figure 10:
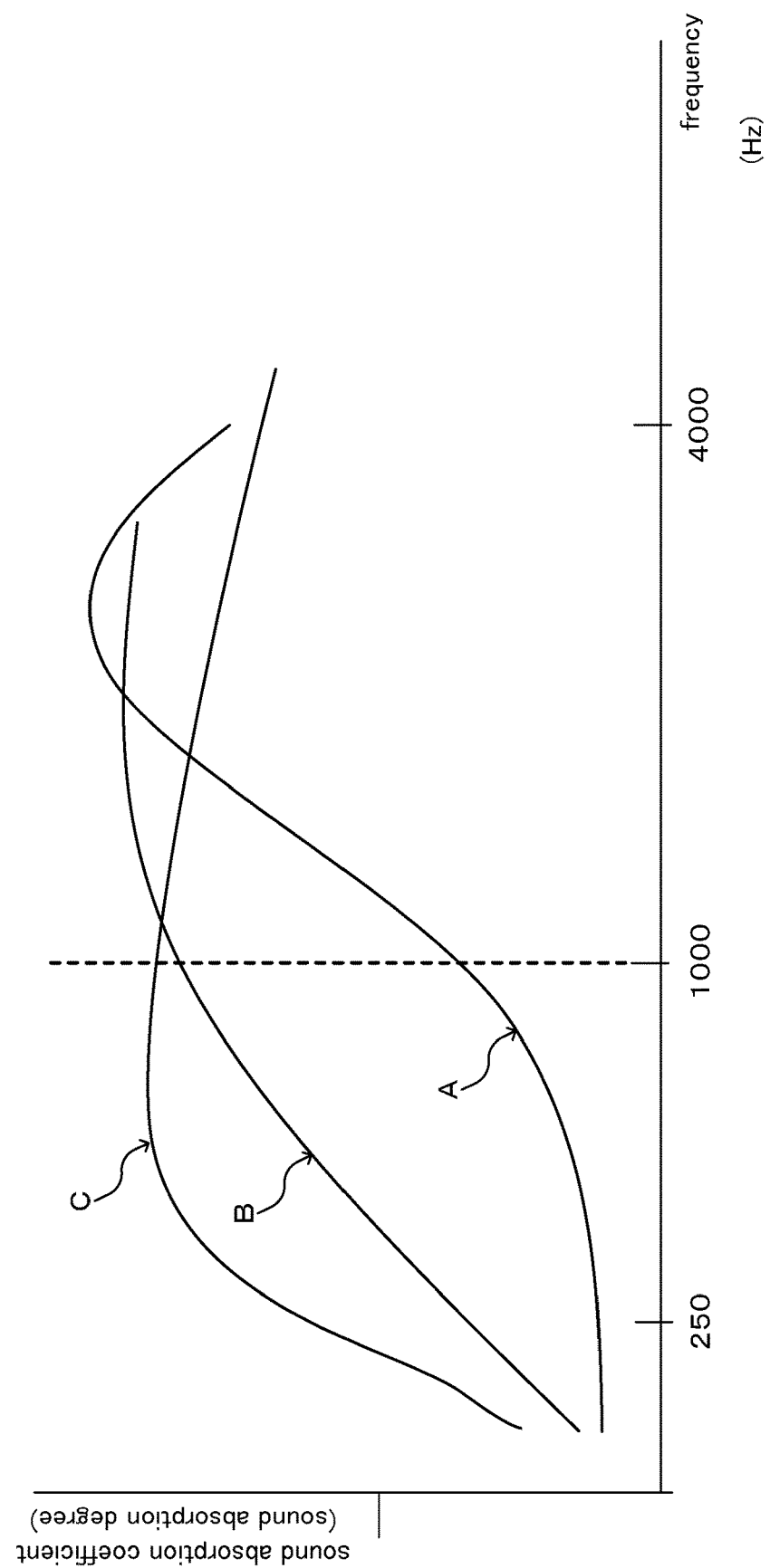
FIG. 10 is a graph illustrating sound absorption characteristics of the sound-absorbing material.

FIG. 10 is a graph illustrating sound absorption characteristics of members arranged in the vehicle interior. In FIG. 10, a curve A shows sound absorption characteristics of the sound-absorbing section 12 that are set in a case where the vertical distance Elh is small and the airflow resistance AFR is 200 (Ns/m$^3$). Furthermore, a curve B shows sound absorption characteristics of the sound-absorbing section 12 that are set in a case where the vertical distance Elh is large and the airflow resistance AFR is 300 (Ns/m$^3$). Additionally, a curve C shows sound absorption characteristics in a case where an airflow resistance AFR of the carpet 42 as a comparative example is 1500 (Ns/m$^3$) or more.

As shown in FIG. 10, the sound-absorbing section 12 is provided so that a sound absorption coefficient at a frequency of 1000 Hz or more is set to be higher than a sound absorption coefficient at a frequency that is less than 1000 Hz. Here, this is because it is considered that a frequency band, in which the degree of influence on the clarity in conversation between the passengers is large, is less than 1000 Hz. Furthermore, it is considered that the frequency band of 1000 Hz or more includes a large amount of unnecessary sound in the vehicle interior, and hence the sound absorption coefficient is set to be high.

Thus, each of the sound-absorbing section 12, the sound-absorbing section 20 and the sound-absorbing section 30 is disposed in the vehicle interior so that the vertical distance Elh is in the range from 0.1 to 0.4 m, and hence the sound-absorbing section is disposed in a predetermined region below the positions of the ears and mouth of the general adult passenger. Consequently, the sound absorption from the conversation between the passengers can be inhibited by the above described sound absorption characteristics, while another unnecessary sound in the vehicle interior can be absorbed.

Figure 11:
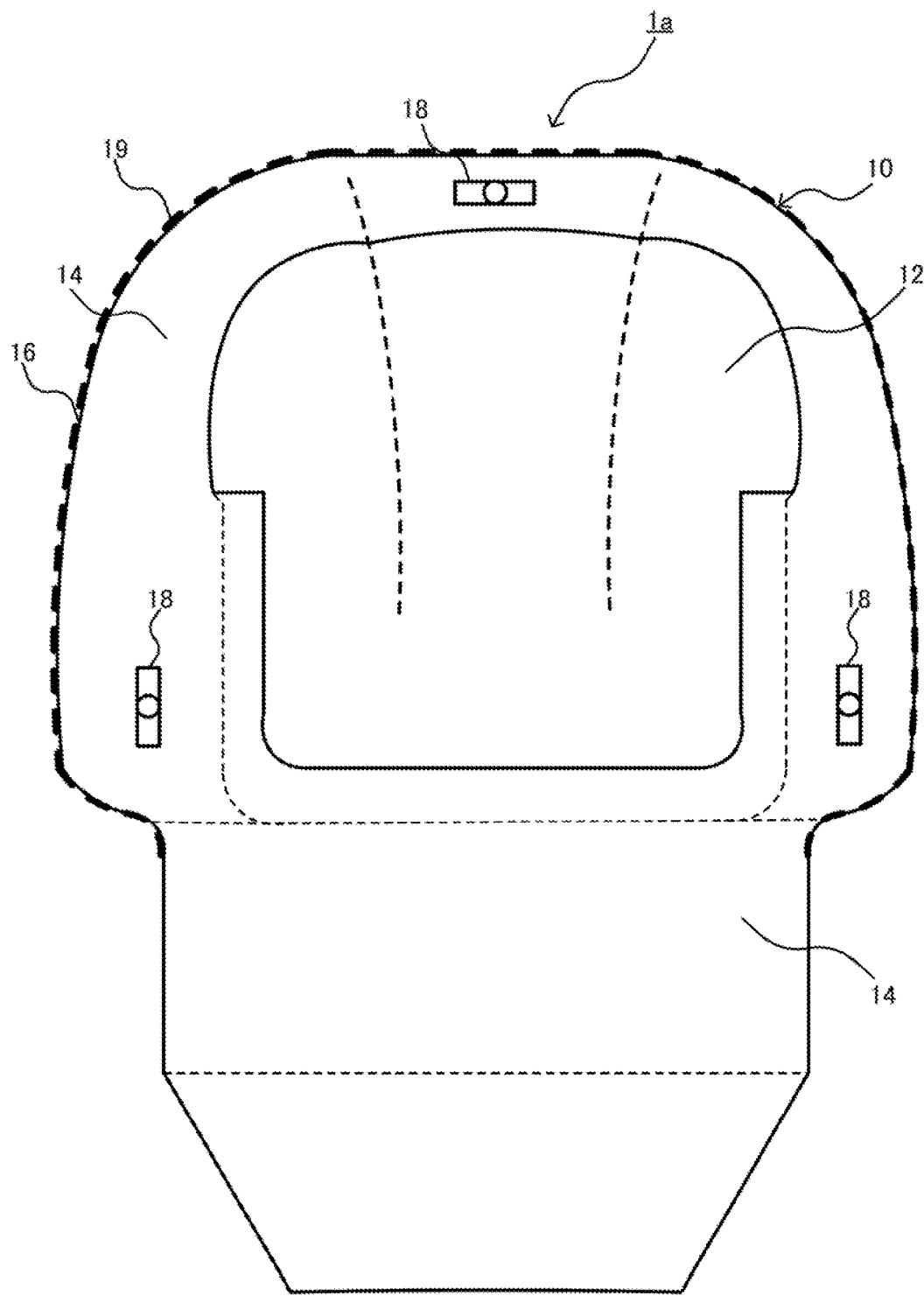
FIG. 11 is a view showing a configuration example of a first modification of the sound-absorbing material for vehicles seen from a back side.

Next, modifications of the sound-absorbing material for vehicles 1 will be described. FIG. 11 is a view showing a configuration example of a first modification (a sound-absorbing material for vehicles 1a) of the sound-absorbing material for vehicles 1 seen from a back side. Hereinafter, substantially the same configuration is denoted with the same reference sign.

As shown in FIG. 11, in the sound-absorbing material for vehicles 1a, a fastener 19 is provided in an end portion of a bent section 16. The fastener 19 enables any member or a predetermined member to be detachably attached to each part that forms the sound-absorbing material for vehicles 1a. For example, the fastener 19 is configured to replaceably and detachably attach a surface 106.

Figure 12:
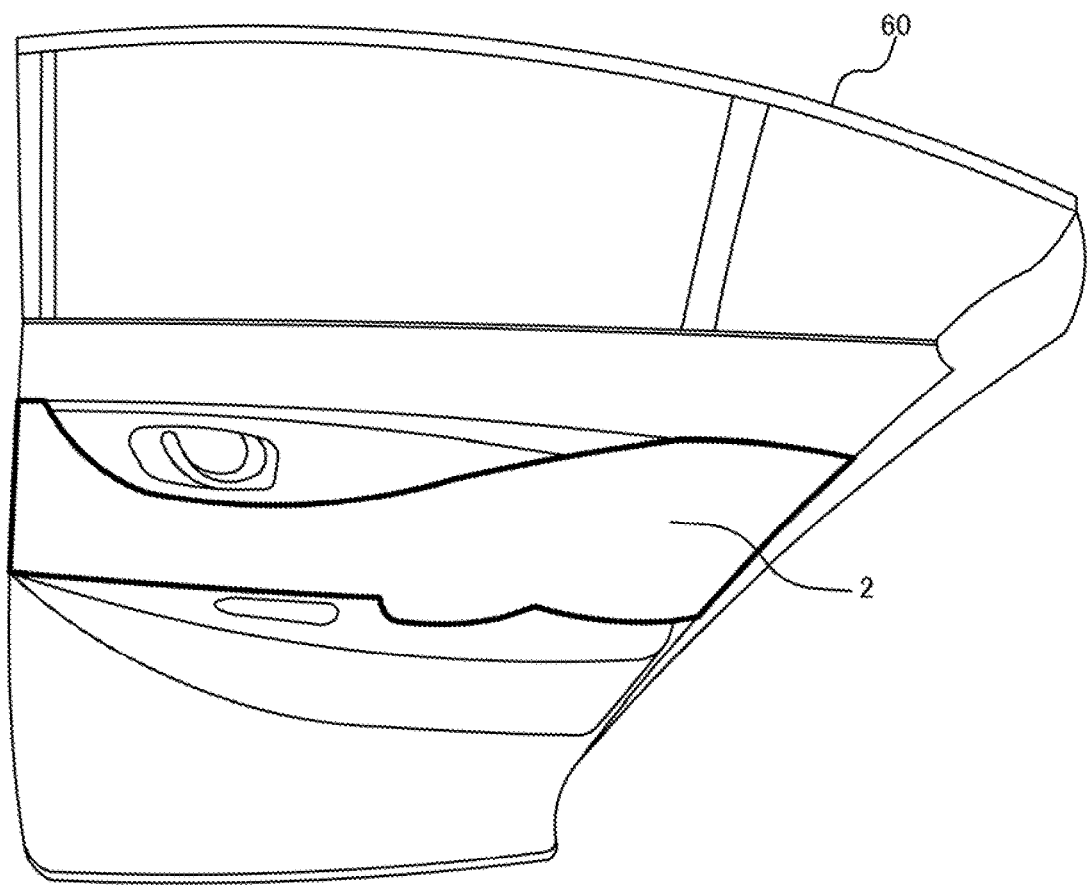
FIG. 12 is a view showing a second modification of the sound-absorbing material for vehicles.

FIG. 12 is a view showing a second modification (a sound-absorbing material for vehicles 2) of the sound-absorbing material for vehicles 1. As shown in FIG. 12, the sound-absorbing material for vehicles 2 is mounted to, for example, a door 60 on a rear seat 52 side, and is configured to comprise a sound-absorbing section 20 shown in FIG. 9.

Next, modifications of the sound-absorbing section 12 will be described.

Figure 13:
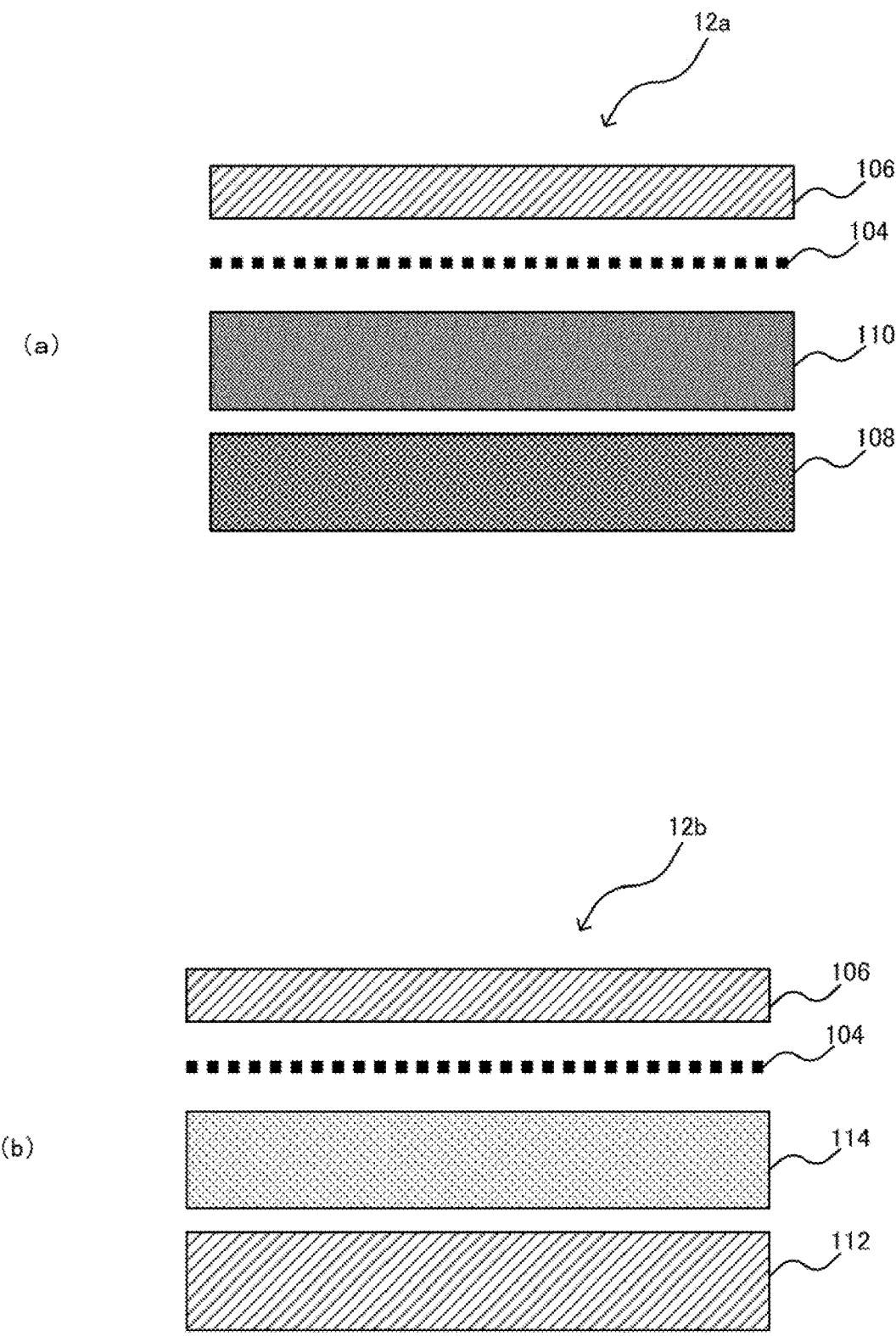
FIG. 13(a) is a view showing a first modification of the sound-absorbing section.
FIG. 13(b) is a view showing a second modification of the sound-absorbing section.

FIG. 13 is a view showing the modifications of the sound-absorbing section 12. FIG. 13(a) is a view showing a first modification (a sound-absorbing section 12a) of the sound-absorbing section 12. FIG. 13(b) is a view showing a second modification (a sound-absorbing section 12b) of the sound-absorbing section 12.

As shown in FIG. 13(a), the sound-absorbing section 12a includes a configuration where, for example, a third fiber material 108, a foam layer of hard urethane 110, PE powder 104 and a surface 106 are stacked and integrally formed.

The third fiber material 108 is, for example, made of 1200 g/m² of PET. The hard urethane 110 is sandwiched between the third fiber material 108 and the surface 106, and has a thickness set to 5 mm or more and 15 mm or less. For example, the thickness of the hard urethane 110 is set to 10 mm.

As shown in FIG. 13(b), the sound-absorbing section 12b includes a configuration where, for example, a fourth fiber material 112, a foam layer of soft urethane 114, PE powder 104 and a surface 106 are stacked and integrally formed.

The fourth fiber material 112 is, for example, made of 600 g/m² of PET. The soft urethane 114 is sandwiched between the fourth fiber material 112 and the surface 106, and has a thickness set to 5 mm or more and 15 mm or less. For example, the thickness of the soft urethane 114 is set to 10 mm.

Note that each of the sound-absorbing section 12a and the sound-absorbing section 12b comprises urethane as the foam layer having a thickness of 5 mm or more, which is a member other than fiber and in which an airflow resistance has a predetermined value or more. This is because, for example, if the thickness of urethane is from 1 to 2 mm, i.e., less than 5 mm, the airflow resistance is small, and influence on acoustic characteristics is small. Note that the foam layer is not limited to urethane, as long as the layer can be formed of a well-known foam material.

Figure 14:
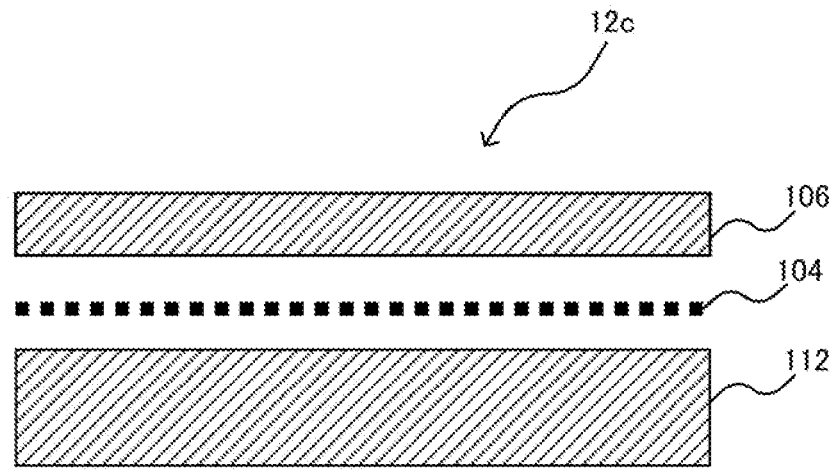
FIG. 14 is a view showing a third modification of the sound-absorbing section.

FIG. 14 is a view showing a third modification (a sound-absorbing section 12c) of the sound-absorbing section 12. As shown in FIG. 14, the sound-absorbing section 12c includes a configuration where, for example, a fourth fiber material 112, PE powder 104 and a surface 106 are stacked and integrally formed.

Figure 15:
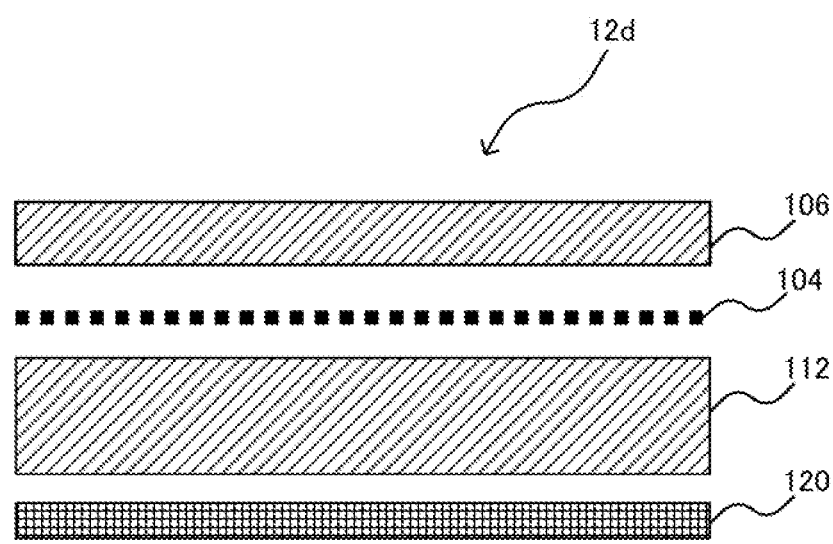
FIG. 15 is a view showing a fourth modification of the sound-absorbing section.

FIG. 15 is a view showing a fourth modification (a sound-absorbing section 12d) of the sound-absorbing section 12. As shown in FIG. 15, the sound-absorbing section 12d includes a configuration where a non-breathable material 120 is stacked on a fourth fiber material 112 of a sound-absorbing section 12c, on a side opposite to the surface 106. For example, the non-breathable material 120 is a non-breathable thin film.

Note that the non-breathable material 120 may be provided to the sound-absorbing section 12a, the sound-absorbing section 12b or the sound-absorbing section 12c described above.

Next, description will be made as to characteristics of the first modification to the third modification of the sound-absorbing section 12 (the sound-absorbing section 12a, the sound-absorbing section 12b, and the sound-absorbing section 12c).

FIG. 16 is a table showing the characteristics of the first modification to the third modification of the sound-absorbing section 12 (the sound-absorbing section 12a, the sound-absorbing section 12b, and the sound-absorbing section 12c). As shown in FIG. 16, the sound-absorbing section 12a has a surface density of 1671 g/m², a thickness of 24.1 mm, and an airflow resistance AFR of 900 Ns/m³. The sound-absorbing section 12b has a surface density of 1323 g/m², a thickness of 23.1 mm, and an airflow resistance AFR of 270 Ns/m³. The sound-absorbing section 12c has a surface density of 1065 g/m², a thickness of 12.1 mm, and an airflow resistance AFR of 240 Ns/m³.

Thus, in a sound-absorbing material for vehicles according to one embodiment, while utilizing design of the sound-absorbing material for vehicles, and improving clarity in conversation between a driver sitting in a front seat and a passenger sitting in a front seat next to the driver or in conversation between the passenger sitting in the front seat and a passenger sitting in a rear seat, unnecessary sound in a vehicle interior can be reduced.

REFERENCE SIGNS LIST 1, 1a, and 2 Sound-absorbing material for vehicles
10 Main body
12, 12a, 12b, 12c, 12d, 20, 22, and 30 Sound-absorbing section
14 rim section
16 Bent section
18 Fixed part
19 Fastener
Front seat
52 Rear seat
54 Dashboard
100 First fiber material
102 Second fiber material
104 PE powder
106 Surface
108 Third fiber material
110 Hard urethane
112 Fourth fiber material
114 Soft urethane
120 Non-breathable material
180 Bonding protrusion
182 Adhesive surface
500 and 520 Head rest

The invention claimed is:

1. A sound-absorbing material for vehicles that is mounted to a vehicle interior and comprises a main body in which at least a fiber material and a surface material are integrally formed, wherein a sound-absorbing section provided in at least a part of the main body is formed to be mounted to the vehicle interior within a range in which a vertical distance Elh downward from a lower surface of a head rest of a front seat is from 0.1 to 0.4 m, and an airflow resistance AFR (Ns/m3) and the vertical distance Elh (m) satisfy a relation of:

$210 < AFR + 10/Elh < 3020$, and the airflow resistance AFR is set for the sound-absorbing section by having a thickness for the sound-absorbing section which is different from a thickness of other areas of the main body.

2. The sound-absorbing material for vehicles according to claim 1, wherein in the sound-absorbing section, a non-breathable material is stacked on the fiber material on a side opposite to the surface material.

3. The sound-absorbing material for vehicles according to claim 1, wherein the sound-absorbing section comprises a foam layer having a thickness of 5 mm or more and 15 mm or less between the fiber material and the surface material.

4. The sound-absorbing material for vehicles according to claim 1, wherein in the sound-absorbing section, a sound absorption coefficient at a frequency of 1000 Hz or more is set to be higher than a sound absorption coefficient at a frequency that is less than 1000 Hz.

5. The sound-absorbing material for vehicles according to claim 1, wherein at least the main body is assembled so as to constitute a part of the appearance of the back surface of the seat.

6. The sound-absorbing material for vehicles according to claim 1, wherein the sound-absorbing section is thicker in a lower part than in an upper part.

7. The sound-absorbing material for vehicles according to claim 1, wherein the sound-absorbing section is configured to not substantially absorb, at a frequency of 1000 Hz or less, a sound of a conversation between a first passenger in a rear seat and a second passenger in a front seat.

8. The sound-absorbing material for vehicles according to claim 1, further comprising:

a bent section formed in a side part and an upper part of the main body; and a rim section formed in a lower part of the main body, wherein the bent section is configured to be fixed along a back side of the front seat in accordance with a roundness around a back surface of the front seat, and wherein the rim section is configured to be bent downward with respect to the front seat.

\* \* \* \* \*